March 10, 1931. W. A. RIDDELL 1,795,797
EXPOSURE GUIDE FOR CAMERA SHUTTERS
Filed July 3, 1929
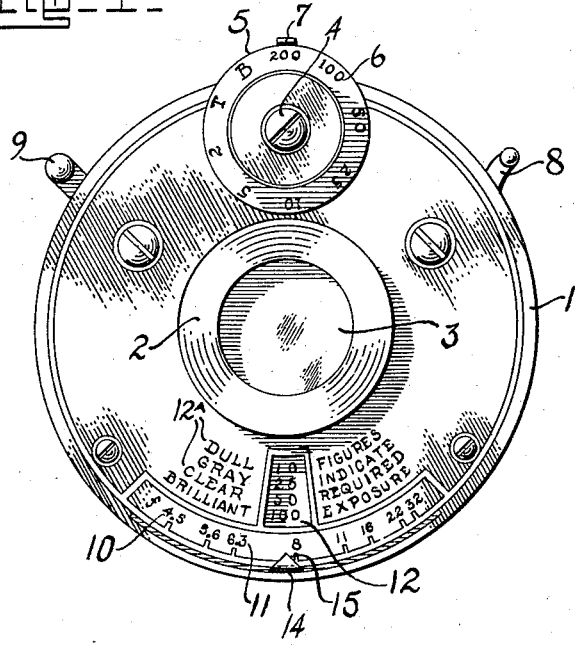
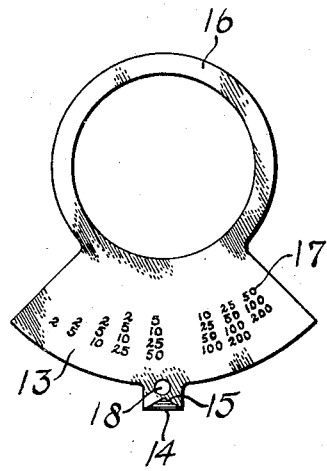
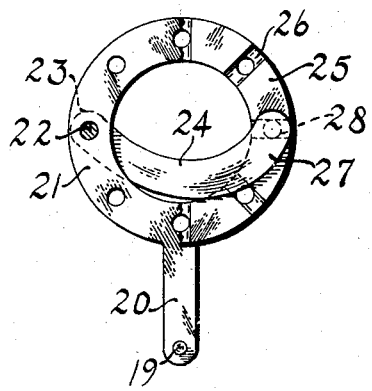
Inventor
William A. Riddell Patented Mar. 10, 1931

1,795,797

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

EXPOSURE GUIDE FOR CAMERA SHUTTERS

Application filed July 3, 1929. Serial No. 375,791.

This invention relates to photography and more particularly to exposure guides to aid a photographer in obtaining the correct exposure under varying light conditions and with apertures admitting different amounts of light to the photographic film. One object of my invention is to provide a device which is neat in appearance and which can be symmetrically placed with respect to the shutter cover. Another object of my invention is to provide a device in which only that portion of the exposure scale which is to be used is in position to be seen. Another object of my invention is to provide a shutter cover with a window through which only a portion of the exposure scale can be viewed at one time. Another object of my invention is to provide an exposure scale connected up to go with a lever for adjusting the diaphragm opening so that as the diaphragm is adjusted the necessary exposure will appear on the camera shutter. Still another object of my invention is to provide an exposure indicator which will indicate the necessary time of exposure for the various light conditions and at the various apertures which it may be desirable to use and other objects will appear from the following specification, the novel features being particularly pointed out in the claims at the end thereof.

In U. S. Patent Number 1,391,870, issued Sept. 27, 1921, to E. E. Underwood and assigned to the Eastman Kodak Company, there is shown an exposure indicator of the same general type and the present invention is for an improvement over the exposure indicator shown in this patent.

Coming now to the drawings wherein like reference characters denote like parts throughout:

Figure 1 is a front elevation of a shutter carrying an exposure guide constructed in accordance with and embodying a preferred form of my invention;

Figure 2 is a similar view of the exposure guide and diaphragm operated lever removed from the shutter shown in Figure 1 and;

Figure 3 is a plan view partially broken away showing parts of a standard type of diaphragm which may be used with my invention.

As shown in Figure 1 a photographic shutter may consist of a cover plate 1 having a lens cell 2 which supports the front element 3 of an objective. The shutter cover 1 also supports on a pivot 4 a dial plate 5 bearing a scale 6 which may be set opposite a pointer 7. The mechanism of the shutter is such that the shutter leaves are opened and closed in an interval corresponding to that portion of the scale which is brought opposite the pointer 7.

The shutter is provided with a setting lever 8 on one side and an exposure trigger 9 on the other side in the present embodiment of my invention although it is obvious that shutters of the non-setting type are equally suitable for use with my invention.

There is the usual scale plate 10 at the bottom of the shutter front plate 1 which bears a scale 11 graduated into units representing the diaphragm opening. As thus far described the shutter may be any standard shutter and may be operated in the usual way without reference to the exposure indicating device.

In order to suggest to the operator the proper exposure under the various conditions I have provided a window 12 in the shutter cover plate 1 and there are four different light conditions indicated by the scale 12A—dull, grey, clear and brilliant. Opposite each one of these four light conditions the time for exposure may be read through the window 12 from the scale plate 13.

The plate 13 preferably forms a part of the diaphragm setting lever 14, the point of which 15 may be brought opposite any diaphragm opening indicated by the scale 11 on the plate 10.

The plate 13, as shown in Figure 2, may form part of a ring 16 which is mounted to move on the shutter cover plate and plate 13 is provided with a scale 17 arranged preferably in four rows so that any one set of figures may come opposite the light indicating designations 12A when the pointer 15 is brought opposite the diaphragm scale indications 11.

The diaphragm lever 14 is preferably connected to a diaphragm of a standard type as indicated in Figure 3 in the following manner: Lever 14 is provided with an aperture 18 adapted to encircle a post 19 on the arm 20, this arm being connected to or integral with a ring 21 which carries a series of studs 22 for holding one end 23 of the diaphragm leaf 24, only one being shown in Figure 3.

Ring 21 is broken away so that the second diaphragm ring 25 which is slotted at 26 can be seen. This ring supports the opposite ends 27 of the diaphragm leaves 24, there being a stud 28 extending from each leaf down into the slot.

By moving one ring 21 relative to the other ring 25 the stud 20 slides in slot 26 and permits the diaphragm leaf 24 to approach nearer or move further away from the center of the two rings. Since there are a plurality of these diaphragm leaves in opening and closing they retain a substantially circular opening which admits different quantities of light through the objective.

The operation of my invention is extremely simple. If the diaphragm lever 14 has been previously set the operator need only look at scale 12A, selecting the proper light condition as for instance, clear. By reading opposite the window 12 he will find that one-fiftieth of a second is the proper exposure at F8. It is then only necessary to turn the dial 5 until 50 comes opposite the pointer 7 and the exposure can be made.

If, on the other hand, the operator desires to use a fast exposure as, for instance, 200 for a motion picture, he may then first set the time dial of the shutter and then turn the exposure lever 14 until he can read 200 from the scale plate opposite the light condition at which the picture is taken. For instance, if the lever 14 be turned to the left until 200 appears first the 200 will appear opposite brilliant. The second appearance of the numeral 200 will be opposite clear, but if it happens to be a dull day a further movement of the pointer 14 will not bring another 200 opposite the window 12 and the operator may rest assured that no picture can be produced at a 200th of a second when the light condition is dull.

Of course, it is a simple matter for a skilled operator to judge fairly closely what the lighting conditions are but with a scale of this type the inexperienced operator is clearly assisted in determining the proper exposure.

Having thus described my invention, what I claim as new and desire to secure by Letters Patent is:

1. In an exposure indicator for cameras, the combination of a shutter, an adjustable diaphragm therein, means for moving the adjustable diaphragm, and a scale movable with the diaphragm adjusting means carrying a plurality of exposure time indicating data, a shutter plate having a window therein bearing a scale indicating the light conditions, a portion of the time indicating scale being visible through the window in the shutter cover opposite the light indicating scale.

2. An exposure indicator for photographic cameras, the combination with a shutter, of an adjustable diaphragm therein, a cover plate for the shutter having an aperture therein, a diaphragm adjusting member mounted on the shutter plate and adapted to turn thereon, said diaphragm adjusting member being provided with a scale plate having a series of time indicating marks thereon, whereby adjusting said diaphragm may bring exposure indicating marks in position beneath the window.

3. In an exposure indicator for photographic cameras, the combination with a shutter, of an adjustable diaphragm therein, a shutter cover plate having a window therein fixedly mounted on the shutter, a diaphragm adjusting ring movably mounted on the shutter cover plate and carrying a scale adapted to be brought opposite the window in the shutter cover, and connections between the ring and a diaphragm through which said diaphragm may be moved as the diaphragm adjusting member is moved.

4. In an exposure indicator for cameras, the combination with a shutter, of an adjustable diaphragm therein, a shutter cover plate fixedly attached to the shutter and having a window therein, a stationary scale bearing indicia relating to light conditions adjacent said window, a diaphragm adjusting member having a portion projecting outside of said shutter cover plate, and mounted to turn inside thereof, a scale plate mounted thereon, said scale plate bearing a plurality of exposure indicating marks thereon located to appear through said window in the shutter cover whereby adjusting said diaphragm pointer may bring exposure indicating marks in position beneath the window to indicate the required exposure for the different lighting conditions designated by said scale adjacent said window.

Signed at Rochester, New York, this 28th day of June, 1929.

WILLIAM A. RIDDELL.